United States Patent [19]

Rambauske

[11] 4,089,607

[45] May 16, 1978

[54] OPTICAL INTERFEROMETER

[75] Inventor: Werner R. Rambauske, Carlisle, Mass.

[73] Assignee: Raytheon Company, Lexington, Mass.

[21] Appl. No.: 702,180

[22] Filed: Jul. 2, 1976

[51] Int. Cl.$^2$ .............................................. G01B 9/02
[52] U.S. Cl. ................................. 356/109; 356/113; 356/124
[58] Field of Search ....................... 356/109, 113, 124

[56] References Cited

U.S. PATENT DOCUMENTS 3,740,150    6/1973    Munnerlyn ...................... 356/124 X

OTHER PUBLICATIONS

MacGovern et al., "Computer Generated Holograms for Testing Optical Elements," Applied Optics, vol. 10, No. 3, pp. 619-624, 3/71.

Primary Examiner—John K. Corbin
Assistant Examiner—Matthew W. Koren
Attorney, Agent, or Firm—Philip J. McFarland; Joseph D. Pannone

[57] ABSTRACT

An optical interferometer for use in observing the optical quality of a relatively large area of a mirror of any shape is disclosed. The disclosed interferometer comprises an arrangement for splitting a beam from a light source into two beams and focusing the two beams on appropriately shaped slits to derive two coherent sources and then directing the light from such sources through conjugate paths (one of which includes a mirror whose surface is to be checked) to a viewing screen. The interference pattern observed on such screen then is determined by the optical quality of the illuminated portion of the mirror being checked.

5 Claims, 3 Drawing Figures

OPTICAL INTERFEROMETER

BACKGROUND OF THE INVENTION

This invention pertains generally to apparatus for optical measurements and particularly to optical interferometers.

It has been standard practice in the art for many years to determine the optical quality of mirrors by utilizing the principles of interference in the design and operation of optical measuring equipment. Thus, it is well known to provide instrumentation whereby a beam of light may be divided into two parts which are caused to traverse different optical paths (sometimes referred to hereinafter, respectively, as the reference path and the test path) and then are caused to be reunited. The interference pattern between the parts making up the reunited beam, then, is an indication of any difference between the reference path and the test path. If, therefore, a mirror to be tested is placed in an appropriate test path, the resulting interference pattern observed on a viewing screen may be taken as an indication of the optical quality, i.e. the smoothness and shape, of such mirror.

While instrumentation of the type being discussed is of practical use for determining the optical quality of many different kinds of mirrors, limitations exist which detract substantially from the value of such instrumentation. That is to say, in addition to the requirement (common to any optical instrumentation) that the elements of any optical interferometer be fabricated and positioned with an extremely high degree of precision, the optical quality of only a relatively small area on a mirror to be tested may be determined at any given time. Such an areal limitation makes the determination of the optical quality of a planar mirror of any substantial size a most difficult, tedious and time-consuming undertaking and the determination of the optical quality of a curved mirror an almost impossible task.

SUMMARY OF THE INVENTION

Therefore, it is a primary object of this invention to provide an improved optical interferometer, such interferometer being adapted to determine the optical quality of a substantial area of a mirror.

Another object of this invention is to provide an improved optical interferometer which is capable of measuring the optical quality of curved mirrors.

The foregoing and other objects of this invention are attained generally by providing, in an optical interferometer, means for providing beams of light in reference and test paths from a beam of light from a source, such paths being arranged so that (when a mirror to be tested is properly positioned in the test path) when the beams in the reference and the test paths are recombined, the resulting interference pattern is an indication of the optical quality of a substantial area of the mirror being tested.

BRIEF DESCRIPTION OF THE DRAWINGS

For a more complete understanding of this invention reference is now made to the following description of preferred embodiments of this invention illustrated in the accompanying drawings, in which.

DESCRIPTION OF THE PREFERRED EMBODIMENTS

Figure 1:
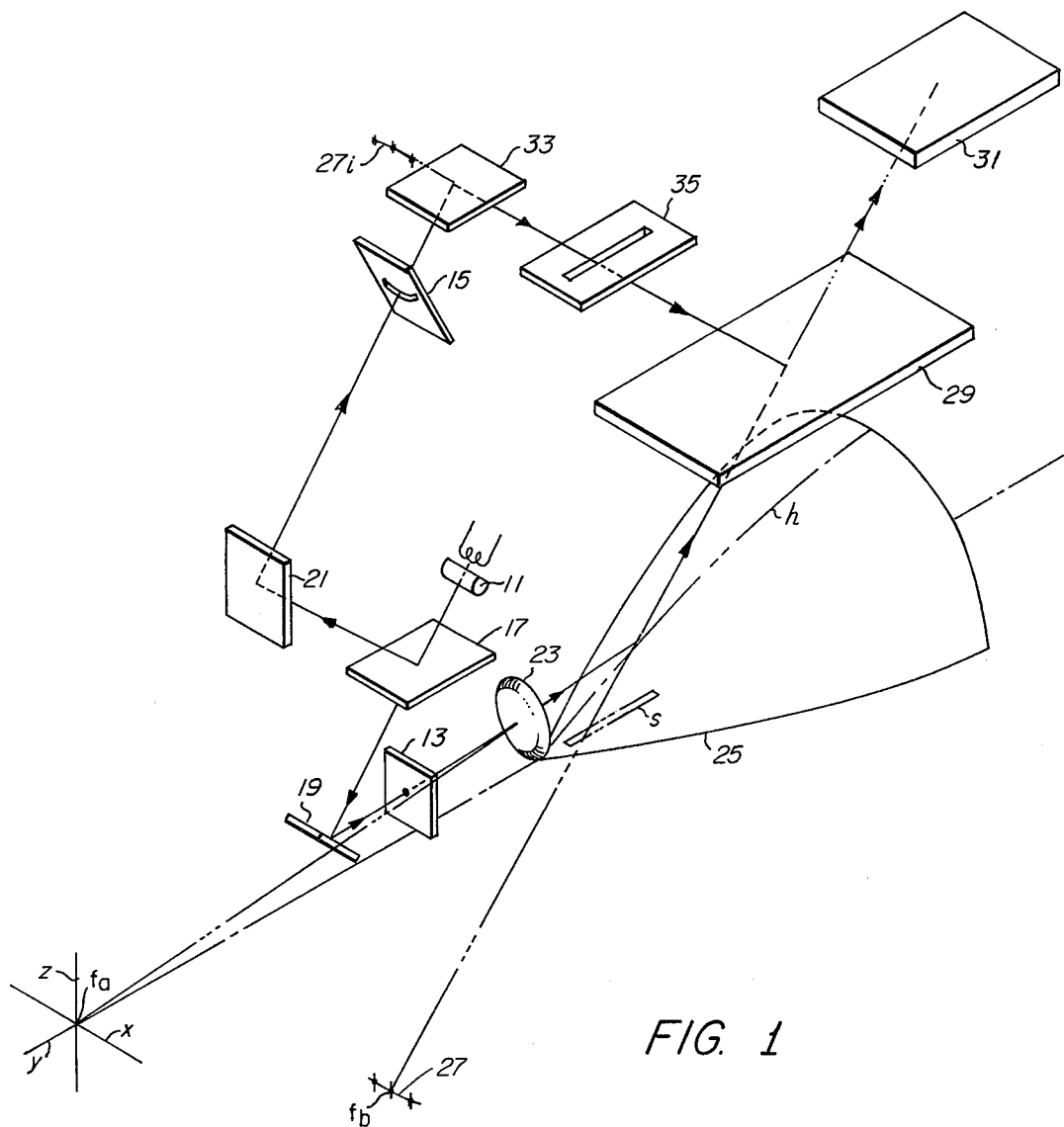
FIG. 1 is a three-dimensional sketch, greatly simplified in that the structure supporting the various elements is not shown to facilitate a clearer understanding of this invention, of an optical interferometer adapted to determine the optical quality of a substantial portion of a particular convex mirror.

Referring now to FIG. 1, it may be seen that the requisite equality between a reference path and a test path in an interferometer adapted to measure the optical quality of a convex mirror is maintained for rays in the meridional plane (that plane defined by the "y" and "z" coordinates in FIG. 1) and every other plane (referred to hereinafter as the nonmeridional plane or planes) in which rays lie. In this connection, it should be noted that, except in FIG. 2A, only a single ray (which may be considered to be the principal ray in the original beam, the beams in the reference and test paths and the recombined beam) in the meridional plane is shown to avoid undue complication of the FIGURE. It will be understood, however, that beams of substantial width are here contemplated so that there are many other rays lying in both the meridional plane and in other planes. Thus, light from a source (not numbered, but which may be an extended incoherent source, preferably producing monochromatic light) is focused by a cylindrical lens 11 at an aperture 13 and at an aperture 15 in, respectively, the test and reference paths. To accomplish such end, the light passing through the cylindrical lens 11 is directed toward a partially reflecting mirror 17 of conventional design to divide the beam from the cylindrical lens into two beams which are respectively reflected from planar mirrors 19, 21 toward the apertures 13, 15. It will be apparent to one of skill in the art that the beams passing through the apertures 13, 15 are rendered, in effect, coherent. That is to say, any change in the light passing through the cylindrical lens 11 appears as a corresponding, but simultaneous, change at the apertures 13, 15. The light out of the aperture 13 is directed, through a lens 23, to the convex surface of a mirror to be tested, here mirror 25. That mirror has a reflecting surface corresponding to the surface formed by rotating a section of hyperbola (here designated by the phantom line marked "h") about the "y" coordinate. One focal point, $f_a$, of the hyperbola is at the origin of the coordinate system x, y, z and the other focal point, $f_b$, is in the y-z plane. It follows then that, as the section, h, is rotated about the "y" coordinate, the focal point, $f_b$, moves in a plane orthogonal to such coordinate on an arc 27 of a circle.

The lens 23 is such as to redirect the rays from the aperture 13 as though such rays had originated at the focal point, $f_a$. It follows, then, that all of the rays in the substantially conical beam reflected from the reflecting surface of the mirror 25 appear to have originated at points along the arc 27. Additionally, considering the planes defined by the rotatation of the section of the hyperbola (designated by the phantom line marked "h") and the focal point, $f_b$, it will be apparent that a portion of the "y" coordinate is common to all such planes. It follows also, then, that all rays reflected from the reflecting surface of the mirror 25 may be deemed to have passed through an imaginary slot, as that shown in phantom and marked "s." Such reflected rays are directed, through a partially reflective mirror 29, to a viewing screen 31.

It will now be appreciated that, if the optical paths of rays in the reference path are to be the same as corresponding rays in the test path, the rays passing through the aperture 15 must be directed to the partially reflective mirror 29 through a path which is effectively the same as those rays in the test path which apparently originate on the arc 27, pass through the imaginary slot, s, and impinge on the partially reflective mirror 29. The required equivalence here is attained by shaping the aperture 15 to correspond with the arc 27 and then:

(a) placing a planar mirror 33 in position to intercept rays passing through the aperture 15 and to direct such rays toward the partially reflecting mirror 29 as though such rays originated at points on an arc 27i (which arc is the mirror image of the arc 27); and (b) allowing rays from the planar mirror 33 to pass through a slot 35 (which slot may conveniently be considered to be the "mirror image" of the imaginary slot, s).

In order that the arc 27i be the mirror image of the arc 27, the aperture 15 must be curved to correspond with the shape of the arc 27; in many cases, however, the aperture 15 may be a rectangular slot without introducing an unacceptably large error. When the aperture 15 is shaped as a rectangular slot, mirrors differently shaped from the mirror 25 may be tested without changing the aperture 15.

Figure 2:
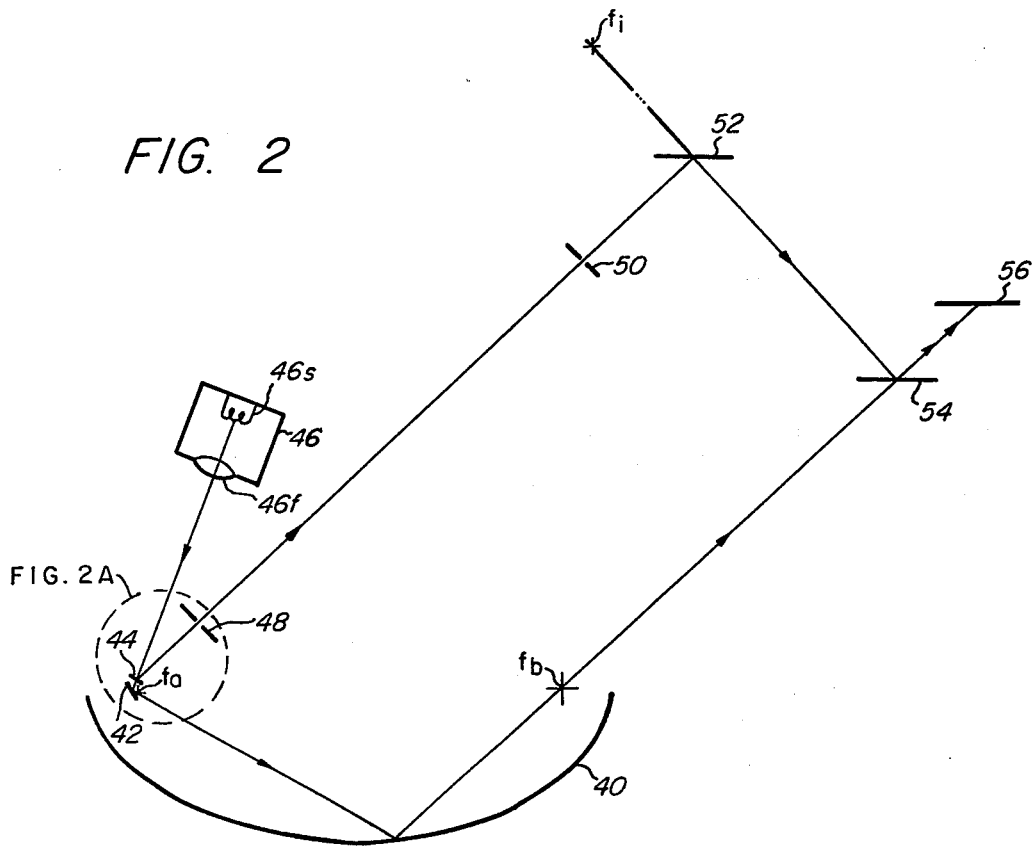
FIG. 2 is a sketch, schematically showing an arrangement according to this invention of elements making up an optical interferometer adapted to determine the optical quality of a substantial area of a particular concave mirror.
Figure 2A:
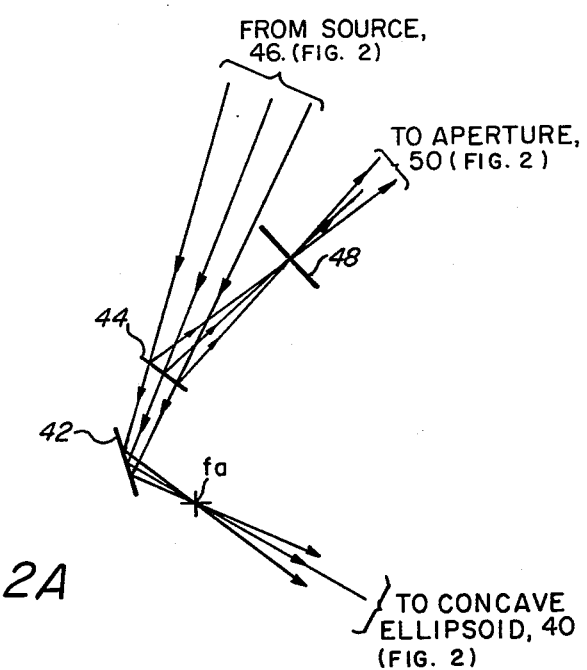
FIG. 2A is an enlargement of the designated part of the sketch in FIG. 2 to more clearly illustrate the arrangement of the elements in such designated part.

Referring now to FIG. 2 and to FIG. 2A, it may be seen that the principles of this invention may be applied to an interferometer for measuring a concave mirror surface. Thus, in the FIGURES, a concave mirror, here a concave ellipsoid 40 (having two focal points marked $f_a$, $f_b$), is disposed in the test path as the mirror to be tested. A planar mirror 42 is disposed in the path of a converging beam (not numbered) of light which is passed through a partially reflective mirror 44 from a source 46. The latter comprises a light source 46s and a lens 46f disposed to focus the beam which is passed through the partially reflective mirror 44 and is reflected from the planar mirror 42 at the focal point $f_a$. The beam which is reflected from the partially reflective mirror 44 is focused on an aperture 48. It will be appreciated, then, that coherency exists between the light in the beam passing through the focal point $f_a$ and the light in the beam passing through the aperture 48. The beam passing through the aperture 48 is directed toward an aperture 50, located at a distance from the aperture 48 equal to twice the major axis of the concave ellipsoid 40. Because the light in the beam passing through the focal point $f_b$ has been reflected from the surface of the concave ellipsoid 40, such light is not coherent with the light in the beam passing through the aperture 50. To attain the requisite coherency, the light in the beam passing through the aperture 50 is reflected from a planar mirror 52 positioned so that the apparent origin of the so-reflected light is at an image point $f_i$, such point also being the image point (with respect to a partially reflective mirror 54) of the focal point $f_b$. Thus, when the light in the test path and the reference path arrive at the partially reflective mirror 54 coherency exists there and at a viewing screen 56.

It will now be appreciated that, with either embodiment just described, coherency between the merged beams exists across the illuminated area on the viewing screen (or 56) to the extent that the shape of the mirror under test (25 or 40) corresponds to its desired shape. That is to say, if the shape of the mirror under test is not true, then incomplete interference patterns will be seen on the viewing screen (31 or 56). If, on the other hand, local perturbations of the surface of the mirror being tested are present, complete interference patterns will be observed. In either case the presence of interference patterns will be indicative of errors in the illuminated portion of the surface of the mirror under test.

Having described two different embodiments of this invention, it will now be apparent to one of skill in the art that the concepts of providing appropriately positioned and shaped apertures in the reference path of an optical interferometer and of providing for an equal number of reflections of light in the reference path and the test path of an optical interferometer may be adapted to permit the determination of the optical quality of a mirror of any shape, including a planar mirror. Further, it will be apparent to one of skill in the art that conventional techniques may be used in the fabrication of the various elements in any optical interferometer constructed according to this invention. It is felt, therefore, that this invention should not be restricted to its disclosed embodiments but rather should be limited only by the spirit and scope of the appended claims.

What is claimed is:

1. An optical interferometer for determining the optical quality of a reflecting surface of a mirror to be tested, such reflecting surface corresponding in shape to the surface generated by rotating a portion of a quadratic conic section about an axis of rotation, such interferometer comprising:

(a) means for splitting a beam of light from a source of monochromatic light into a first and a second beam of light, such first and second beam being coherent with each other;

(b) means for directing the first beam of light toward the reflecting surface of the mirror to be tested, such reflecting surface then directing such first beam toward a viewing screen as through such beam originated at a focal point of such reflecting surface; and (c) means for directing the second beam of light toward the viewing screen, the path of each ray in the second beam falling on such screen being the conjugate of the path of each corresponding ray in the first beam falling on such screen.

2. An optical interferometer as in claim 1 wherein the first-named means includes:

(a) a cylindrical lens disposed in the path of the beam of light from the source of monochromatic light, such cylindrical lens being adapted to focus such beam along a focal line;

(b) a partially reflective mirror disposed in the path of the beam of light out of the cylindrical lens, such partially reflective mirror being adapted to split such beam into the first and the second beam of light focused, respectively, along a first and a second line, each one thereof being parallel to the focal line; and (c) a first and a second aperture disposed, respectively, at the first and the second line.

3. An optical interferometer as in claim 2 wherein the shape of the first and the second apertures correspond, respectively, to the shape of a first focus of the convex reflecting surface of the mirror to be tested and to a rectangle.

4. An optical interferometer as in claim 3 wherein the means for directing the first beam of light toward the reflecting surface of the mirror to be tested includes a lens arrangement disposed in the path of such first beam and adapted to change the origin of such beam from the first aperture to an apparent origin coincident with the first focus of such reflecting surface.

5. An optical interferometer as in claim 4 wherein the means for directing the second beam of light toward the viewing screen includes:

(a) a third aperture corresponding in shape to the second focus of the reflecting surface of the mirror to be tested; and (b) a mirror disposed in the path of the beam out of the third aperture, such mirror being effective finally to reflect the second beam toward the viewing screen as though such beam had originated at the mirror image of the second focus of the convex reflecting surface of the mirror to be tested.

* * * * *